United States Patent Office 3,842,099
Patented Oct. 15, 1974

3,842,099
NAPHTHO(2,1-d)ISOXAZOLE DERIVATIVES
Yasushi Suzuki, Yokohama, Toshihisa Itaya and Nobuyoshi Minami, Kawasaki, Masaaki Tarutani, Tokyo, Tokutaro Miki, Hachioji, and Katsuhiko Miyasaka, Kawasaki, Japan, assignors to Teikoku Hormone Mfg. Co., Ltd., Tokyo, Japan
No Drawing. Original application Oct. 6, 1969, Ser. No. 864,163, now abandoned. Divided and this application Jan. 13, 1972, Ser. No. 217,632
Int. Cl. C07d 85/22
U.S. Cl. 260—307 D                 10 Claims

ABSTRACT OF THE DISCLOSURE 3-substituted naphth[2,1-d]isoxazoles and their derivatives and a process for producing the same, the isoxazoles being represented by the formula

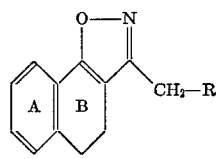

wherein the ring A may be substituted or unsubstituted, the ring B may have a carbon-to-carbon double bond between the positions of C–4 and C–5, and R represents a hydroxyl group, a halogen atom, or a cyano group.

---

This application is a divisional application of our copending application Ser. No. 864,163 filed on Oct. 6, 1969, now abandoned. This invention relates to a novel 3-substituted naphth[2,1-d]isoxazolyl derivative and to a process for preparing the same.

According to this invention, a 3-substituted naphth[2,1-d]isoxazolyl derivative expressed by the general formula

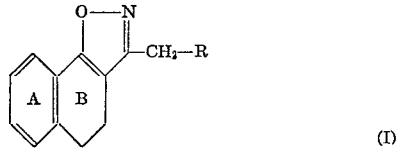

wherein the ring A may be substituted or unsubstituted, the ring B may have a carbon-to-carbon double bond between the positions of C–4 and C–5, and R represents a hydroxyl group, a halogen atom or a cyano group is provided.

In the above general formula (I), the ring A may be mono-, di- or tri-substituted with optional substituents; for instance, alkoxy groups such as methoxy, ethoxy, n- or iso-propoxy and n-, iso-, sec- or tert-butyl, preferably alkoxy groups of 4 or less carbon atoms; alkyl groups such as methyl, ethyl and n- or iso-propyl, preferably alkyl groups of 4 or less carbon atoms; and halogen atoms such as bromine, chlorine, and iodine. The ring B may either be saturated between the positions of C–4 and C–5 or have a carbon-to-carbon double bond between the positions of C–4 and C–5.

Novel compounds expressed by above general formula (I) are divided into the following three groups.

Compounds of the first group are 3-hydroxymethyl-naphth[2,1-d]isoxazoles and their derivatives expressed by the following general formula:

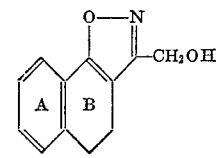

wherein the rings A and B are as defined in general formula (I).

Examples of the compounds expressed by above general formula (II) are as follows:

3-hydroxymethyl-8-methoxy-4,5-dihydro-naphth[2,1-d]
  isoxazole,
3-hydroxymethyl-7-methoxy-4,5-dihydro-naphth[2,1-d]
  isoxazole,
3-hydroxymethyl-6-ethoxy-4,5-dihydro-naphth[2,1-d]
  isoxazole,
3-hydroxymethyl-7-methoxy-6-chloro-4,5-dihydro-naphth
  [2,1-d]isoxazole,
3-hydroxymethyl-8-methoxy-naphth[2,1-d]isoxazole,
3-hydroxymethyl-7-methoxy-naphth[2,1-d]isoxazole, and
3-hydroxymethyl-7-methoxy-6-chloro-naphth[2,1-d]
  isoxazole.

Compounds of the second group included in the novel compounds of above general formula (I) are 3-halomethyl-naphth[2,1-d]isoxazoles and their derivatives expressed by the following general formula:

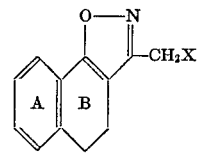

wherein X stands for a halogen atom such as chlorine, bromine or iodine, particularly a chlorine atom, and the rings A and B are as defined in above general formula (I).

Examples of the compounds expressed by above general formula (III) are as follows:

3-chloromethyl-8-methoxy-4,5-dihydro-naphth[2,1-d]
  isoxazole,
3-chloromethyl-7-methoxy-4,5-dihydro-naphth[2,1-d]
  isoxazole,
3-chloromethyl-6-ethoxy-4,5-dihydro-naphth[2,1-d]
  isoxazole,
3-bromomethyl-8-methoxy-4,5-dihydro-naphth[2,1-d]
  isoxazole,
3-bromomethyl-7-methoxy-4,5-dihydro-naphth[2,1-d]
  isoxazole,
3-bromomethyl-6-ethoxy-4,5-dihydro-naphth[2,1-d]
  isoxazle,
3-bromomethyl-8-ethyl-4,5-dihydro-naphth[2,1-d]
  isoxazole,
3-bromomethyl-7-ethyl-4,5-dihydro-naphth[2,1-d]
  isoxazole,
3-chloromethyl-4,5-dihydro-naphth[2,1-d]isoxazole,
3-bromomethyl-4,5-dihydro-naphth[2,1-d]isoxazole,
3-chloromethyl-8-methoxy-naphth[2,1-d]isoxazole,
3-chloromethyl-8-methoxy-7-chloro-naphth[2,1-d]
  isoxazole,
3-chloromethyl-7-methoxy-naphth[2,1-d]isoxazole,
3-chloromethyl-7-methoxy-6-chloro-naphth[2,1-d]
  isoxazole,
3-bromomethyl-naphth[2,1-d]isoxazole,
3-bromomethyl-8-methoxy-naphth[2,1-d]isoxazole, and
3-bromomethyl-7-methoxy-naphth[2,1-d]isoxazole.

Compounds of the third group included in the compounds expressed by above general formula (I) are 3-cyanomethyl-naphth[2,1-d]isoxazoles and their derivatives expressed by the following formula:

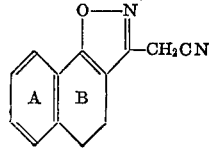

wherein the rings A and B are as defined above in above general formula (I).

As specific examples of the compound (IV), the following compounds may be cited:

3-cyanomethyl-8-methoxy-4,5-dihydro-naphth[2,1-d] isoxazole,
3-cyanomethyl-7-methoxy-4,5-dihydronaphth[2,1-d] isoxazole,
3-cyanomethyl-6-ethoxy-4,5-dihydro-naphth[2,1-d] isoxazole,
3-cyanomethyl-4,5-dihydro-naphth[2,1-d]isoxazole,
3-cyanomethyl-8-ethyl-4,5-dihydro-naphth[2,1-d] isoxazole,
3-cyanomethyl-7-ethyl-4,5-dihydro-naphth[2,1-d] isoxazole,
3-cyanomethyl-8-methoxy-naphth[2,1-d]isoxazole,
3-cyanomethyl-7-methoxy-naphth[2,1-d]isoxazole,
3-cyanomethyl-6-ethoxy-naphth[2,1-d]isoxazole,
3-cyanomethyl-naphth[2,1-d]isoxazole,
3-cyanomethyl-7-methoxy-6-chloro-naphth[2,1-d] isoxazole,
3-cyanomethyl-8-methoxy-7-chloro-naphth[2,1-d] isoxazole, and
3-cyanomethyl-6-bromo-naphth[2,1-d]isoxazole.

Novel compounds of this invention expressed by above general formulae (II), (III) and (IV) may be synthesized by methods which will be illustrated below.

Compounds expressed by above general formula (II) can be synthesized by reducing a compound expressed by the following general formula:

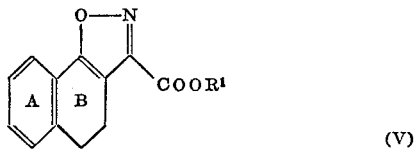

(V)

wherein $R^1$ represents a hydrogen atom, an alkyl group, an alkali metal, an alkaline earth metal or an ammonium group, and rings A and B are as defined in general formula (I), by a method known *per se*.

More specifically, the reduction of compounds of the formula (V) can be performed by employing a metal hydride such as an alkali metal aluminum hydride, e.g., LiAlH4, and an alkali metal boron hydride, e.g., NaBH4; a hydrogenated metal complex such as sodium dihydrobis(2-methoxyethoxy)aluminate

[H2NaAl(OCH2CH2OCH3)2]

or a combination of an alcohol with an alkali or alkaline earth metal. Further, for instance, a combination of a mineral acid such as hydrochloric acid with a metal such as zinc may be used. Of course, the reducing agent to be used in this invention should not be one which reduces the isoxazole ring.

The reduction of the compound of the formula (V) can be performed by dissolving or suspending the compound into an organic solvent inert to the reaction, for instance, an ether such as tetrahydrofuran and ethyl ether; an aromatic hydrocarbon such as benzene, toluene and xylene; an alcohol such as methanol, ethanol and butanol; or a carboxylic acid such as acetic acid, and adding the above mentioned reducing agent to the solution or suspension.

The reaction temperature is not particularly critical, but the reaction is generally conducted at a temperature ranging from room temperature to the boiling point of the solvent used, preferably from 25 to 150° C. The reaction is performed sufficiently under atmospheric pressure, but it is possible to carry out the reaction under elevated pressure.

The intended hydroxy methyl product of the formula (II) can be isolated in a pure form by distilling off the  organic solvent from the reaction mixture, throwing the residue into a non-solvent such as water, and recovering the insoluble matter by filtration or extraction, if necessary, followed by recrystallization or chromatography.

Compounds of above general formula (V) in which ring B is saturated between the positions of C–4 and C–5, which are to be used as starting compounds in the above reaction, may be synthesized by reacting a known 1-oxo-1,2,3,4-tetrahydro - 2 - naphthylglyoxylic acid alkyl ester expressed by the general formula

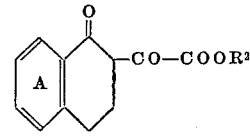

(VI)

wherein $R^2$ represents an alkyl group, and ring A is as defined in general formula (I), with hydroxyl amine or its salt according to a method known *per se*.

The so formed compounds expressed by the following general formula:

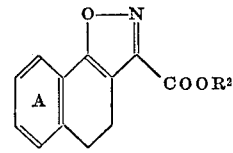

(V')

wherein $R^2$ and ring A are as defined above, may be converted by the hydrolysis employing an acid or alkali to the corresponding free carboxylic acids in which $R^1$ in above general formula (V) stands for a hydrogen atom.

The preparation of 4,5-dihydro-naphth[2,1-d]isoxazol-yl-3-carboxylic acid esters of the formula (V') from 1-oxo-1,2,3,4-tetrahydro - 2 - naphthylglyoxylic acid alkylesters of the formula (VI) and hydroxylamine, and the preparation of the free carboxylic acids from the esters of the formula (V') may be conducted in accordance with the method proposed in publication No. 25,656/67 of Japanese patent application or similar methods.

Compounds of general formula (V) in which the ring B has a carbon-to-carbon double bond between the positions of C–4 and C–5 may be obtained by subjecting the so formed esters of general formula (V') or the corresponding free carboxylic acids to cyclo-dehydrogenation treatment.

The cyclo-dehydrogenation treatment may be accomplished, for instance, in an organic solvent which is inert to the reaction under such mild conditions as will not cause any change in the isoxazole ring by employing an ordinary dehydrogenating agent. Dehydrogenating agents particularly suitable for accomplishing the above-mentioned cyclo-dehydrogenation treatment include:

(1) chloranil and DDQ (dichlorodicyanobenzoquinone);
(2) mild oxidants such as anhydrous chromic acid in acetic acid;
(3) molecular halogens such as $Cl_2, Br_2$ and $I_2$; and
(4) phosphorus pentahalides such as $PCl_5$ and $PBr_5$.

Reaction conditions vary depending upon the class of the dehydrogenating agent, but the dehydrogenation is generally carried out at temperatures ranging from room temperature to 200° C.

In the case of using a dehydrogenating agent such as chloranil and DDQ, it is preferable to carry out the dehydrogenation with the use of an inert organic solvent such as benzene, toluene and xylene at the boiling point of the solvent. In the case of using anhydrous chromic acid in acetic acid as the dehydrogenating agent, it is desired to perform the reaction at a temperature within a range from room temperature to 50° C. When the reaction temperature exceeds the above range, the side reaction occurs at the isoxazolering. When using a molecular halogen as the dehydrogenating agent, it is preferable to dissolve the molecular halogen into a halogenated hydrocarbon medium such as carbon tetrachloride and chloroform, and to conduct the reaction at the boiling point of the solvent to be used. In this case, the reaction may be conducted with or without the aid of an activating agent such as a catalyst or light. In the case of using a phosphorus pentahalide as the dehydrogenating agent, a phosphorus trihalide, a phosphorus oxyhalide, a halogenated hydrocarbon and other inert organic solvent such as benzene are used as the reaction medium and preferably the reaction may be carried out at the boiling point of the solvent to be used.

In the case of using a molecular halogen or a phosphorus pentahalide, the use of such dehydrogenating agent in an excessive amount sometimes results in the introduction of a halogen substituent into ring A of the naphthoisoxazole, but the introduction of such halogen substituent does not bring about any disadvantage with respect to the object of this embodiment of introducing a carbon-to-carbon double bond between the positions of C–4 and C–5 of ring B of the 4,5-dihydronaphthisoxazole.

Compounds of general formula (II) in which ring B has a carbon-to-carbon double bond between the positions of C–4 and C–5 may be formed by subjecting the so obtained compounds of general formula (II) in which the ring B is saturated between the positions of C–4 and C–5 to the above-mentioned cyclo-dehydrogenation treatment, or by employing as starting reagents compounds of general formula (V) in which ring B has a carbon-to-carbon double bond between the positions of C–4 and C–5.

Novel compounds of the second group of this invention, namely halomethyl compounds expressed by general formula (III), may be prepared by halogenating the so obtained hydroxymethyl compounds of general formula (II) under known halogenation conditions.

The halogenation of the hydroxymethyl compound of the formula (II) may be carried out under halogenation conditions known per se. Of course, the halogenation reagent to be used should not be one that reacts with the isoxazole ring. The halogenation reagents to be used include a phosphorus trihalide such as $PCl_3$, $PBr_3$ and $PI_3$, a phosphorus pentahalide such as $PCl_5$ and $PBr_5$, or a phosphoryl halide such as $POCl_3$ and $POBr_3$. It is preferable to conduct the reaction with the use of such hydrogenation reagent in an amount greater than the equivalent amount based on the hydroxymethyl product of the formula (II), especially 1 to 3 equivalents. When the hydrogenation reagent is used in an amount greater than the equivalent amount, the dehydrogenation between the positions of C–4 and C–5 of ring B namely, the formation of a double bond between the positions of C–4 and C–5 and the halogenation of ring A as well as the halogenation of the hydroxymethyl group sometimes occur coincidentally in the compounds saturated between the positions of C–4 and C–5 depending upon the polarity of the solvent to be used. Even though such reactions occur, it does not disturb the attainment of the object of this invention.

The reaction temperature is not particularly critical but generally a temperature ranging from 50 to 150° C. is adopted. As the reaction medium, inert organic solvents for instance, halogenated hydrocarbons such as carbon tetrachloride, chloroform, and chlorobenzene; hydrocarbons such as benzene, toluene, xylene and kerosene; or ethers such as ethyl ether, and tetrahydrofuran are preferably used. Also, the reaction is conducted at the boiling point of the solvent to be used.

Compounds of general formula (III) in which ring B has a carbon-to-carbon double bond between the positions of C–4 and C–5 may be prepared by subjecting the so obtained compounds of general formula (III) in which ring B is saturated between the positions of C–4 and C–5 to the above-mentioned cyclo-dehydrogenation treatment or by employing as starting reagents compounds of general formula (II) in which ring B has a carbon-to-carbon double bond between the positions of C–4 and C–5.

Compounds of the third group of this invention, namely cyanomethyl compounds expressed by general formula (IV), may be formed by reacting the so obtained halomethyl compounds of general formula (III) with an inorganic cyano compound.

Any inorganic cyano compound that is generally known to react with an alkyl halide can be used as the inorganic cyano compound. For instance, inorganic cyano compounds of the formula $$M^3(CN)_n \qquad (VII)$$

wherein $M^3$ is (a) a metal (such as an alkali metal, e.g., sodium, potassium or lithium, an alkaline earth metal, e.g., calcium, magnesium or barium, and silver, copper, mercury, zinc or lead), (b) ammonium, (c) hydrogen or (d) a cyano group, and $n$ is the valence of $M^3$, may be preferably used.

The reaction between the halide of the formula (III) and the inorganic cyano compound can be performed under conditions known per se. For instance, this cyanogenation reaction may be conducted in the presence of a polar substance at a temperature ranging from room temperature to the boiling point of the reaction system, preferably from 50 to 150° C. The reaction may be performed sufficiently under atmospheric pressure, but of course, it is possible to carry out the reaction under either reduced or elevated pressures. As the polar substance water; lower alcohols such as methanol and ethanol; carboxylic acids such as formic acid, oxalic acid and acetic acid; ethers such as tetrahydrofuran and ethyl ether; halogenated aliphatic hydrocarbons such as chloroform and dichloroethane; N,N-di-substituted acylamides such as dimethyl formamide, diethyl formamide and dimethyl acetamide; and di-substituted sulfoxides such as dimethyl sulfoxide may be used and diethyl sulfoxide. These polar substances may be used in the state added to an organic solvent which is non-polar by itself.

Compounds of formula (IV) in which ring B has a carbon-to-carbon double bond between the positions of C–4 and C–5 may be prepared by subjecting the so obtained compounds of formula (IV) in which ring B is saturated between the positions of C–4 and C–5 to the above-mentioned cyclo-dehydrogenation treatment, or by employing as starting reagents compounds of formula (III) in which ring B has a carbon-to-carbon double bond between the positions of C–4 and C–5.

The so obtained compounds of general formula (I), namely compounds expressed by general formulae (II), (III) and (IV), are important intermediates leading to naphth[2,1-d]isoxazolyl alkanoic acids and their derivatives and salts of the following general formula which have excellent analgesic, antipyretic and anti-inflammatory activities and which are superior to non-steroidal anti-inflammatory medicines by their high pharmacological activities and low toxicity:

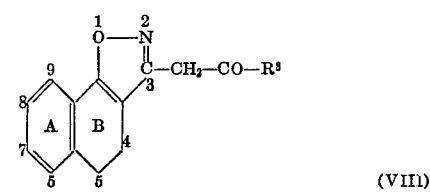

(VIII)

wherein ring A may be substituted or unsubstituted, ring B may have a carbon-to-carbon double bond between the positions of C–4 and C–5, and $R^3$ stands for a hydroxyl group, a group —OM (in which M is sodium, potassium, aluminum, magnesium, calcium or ammonium), an alkoxy group, an optionally substituted amino group, an optionally substituted aminoalkyl amino group, an optionally substituted aminoalkoxy group, a morpholino group, a piperidino group, an N-alkylpiperazino group or a pyrrolidino group.

For instance, compounds of general formula (VIII) in which $R^3$ stands for a hydroxyl or amino group, namely compounds of the following formula (VIII'),

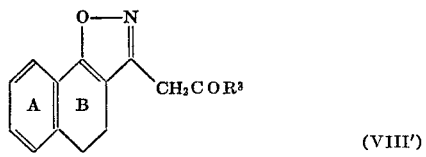

(VIII')

wherein $R^{3\prime}$ represents a hydroxyl or amino group, and the rings A and B are as defined above, may be synthesized by hydrolyzing a cyanomethyl compound of general formula (IV) or by reacting a halomethyl compound of general formula (III) with an inorganic cyano compound in the presence of water.

The preparation of pharmaceutically useful compounds of general formula (VIII) from novel compounds of general formula (I) and the utilization of the compounds of above general formula (VIII) are detailed in the specification of our copending application Ser. No. 864,163 as follows:

The novel compounds of this invention expressed by the above-mentioned general formula (I) [general formula (I) in Ser. No. 864,163 is the same as general formula (VIII) of the instant application] have excellent analgesic anti-pyretic and anti-inflammatory activities, and have a prominent advantage that they exhibit a much lower toxicity as compared with conventional non-steroidal anti-inflamation agents. They have another advantage that in the oral administration they do not cause any troubles to digestive organs, particularly any gastroenteric disturbances or disorders.

Accordingly, the novel compounds of this invention may be used in forms of various formulations for remedy of arthritis, rheumatism and other various inflammatory diseases. The novel naphthisoxazolyl alkanoic acids and their derivatives may be administered to patients orally or by hypodermic or intramuscular injection. For the oral administration, the novel compounds of this invention may be blended with a carrier known per se such as lactose, starch, talc, magnesium carbonate, alumina, tragacanth gum or arabic rubber and applied in the form of powder, tablets, capsules, granules or the like, or they may be applied in the form of a liquid formulation prepared by dispersing them into a liquid carrier such as water and syrup. For the hypodermic or intramuscular injection, the novel compounds of this invention may be administered in the form dissolved or dispersed in sodium chloride physiological solution or sterilized distilled water.

The suitable doses of the novel compounds of this invention must be differentially decided depending on the condition, age, sex, medical history and constitution of a patient and the class of the compound to be administered, but generally, sufficient curing effects can be attained by an administration of 10 to 100 mg. per dose, 10 to 300 mg. per day.

Generally, the pharmaceutically useful compounds of general formula (VIII) may be synthesized from novel compounds of this invention expressed by general formula (I) through the following reaction routes:

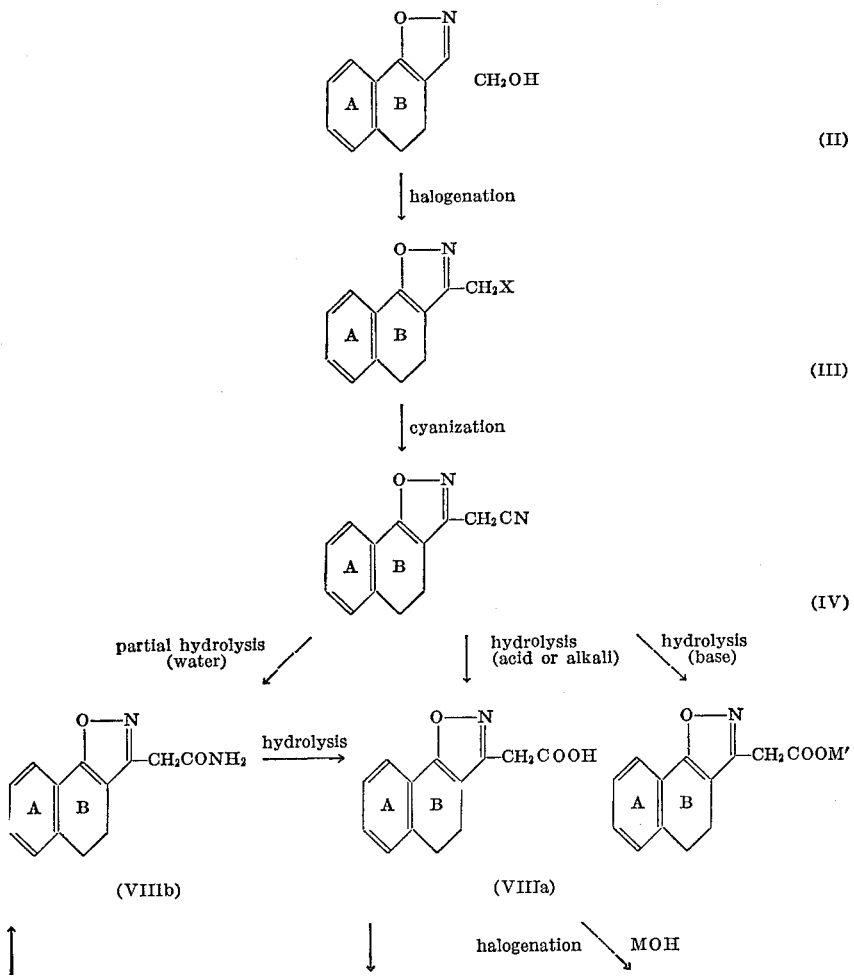

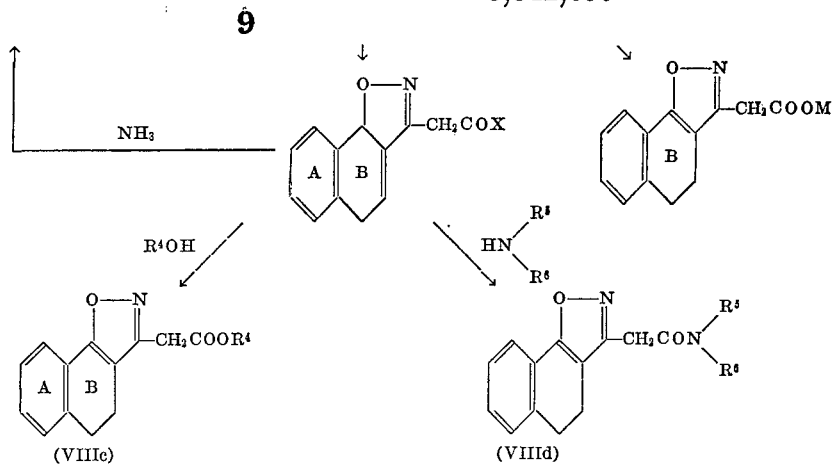

In each of the above formulae, R[4] stands for an alkyl group or a group

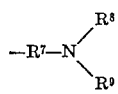

(in which R[7] represents an alkylene group, R[8] and R[9], which may be the same or different, stand for a hydrogen atom or an alkyl group, or they may form together with the nitrogen atom a heterocyclic ring which may further comprise an oxygen, sulfur or nitrogen atom), R[5] and R[6], which may be the same or different, represent a hydrogen atom, an alkyl group or a group

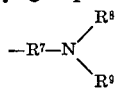

M' stands for a residue of a base, and X, M, and the rings A and B are as defined above.

In a preferable embodiment of the process described above, the cyano group containing compound of the above-mentioned formula (IV) is formed and then subjected to hydrolysis after or without the isolation of the compound of formula (IV). Further, the cyanogenation of the halide of the formula (III) and the hydrolysis of the cyano group may be performed coincidentally by conducting the cyanogenation in the presence of water. The latter method is advantageous in that the introduction of the cyano group and the hydrolysis of the cyano group can be performed coincidentally by a single step and that the introduction of the cyano group can be easily achieved.

For better illustration of the compounds of the above general formula (VIII), specific examples thereof will be cited below.

(1) Naphth[2,1-d]isoxazolyl-3-alkanoic acids of the formula (VIIIa) and their salts such as:
4,5-dihydronaphth[2,1-d]isoxazolyl-3-ethanoic acid,
7-methoxy-4,5-dihydronaphth[2,1-d]isoxazolyl-3-ethanoic acid,
8-methoxy-4,5-dihydronaphth[2,1-d]isoxazolyl-3-ethanoic acid,
7,8-dimethoxy-4,5-dihydronaphth[2,1-d]isoxazolyl-3-ethanoic acid,
naphth[2,1-d]isoxazolyl-3-ethanoic acid,
6-chloro-7-methoxy-naphtho[2,1-d]isoxazolyl-3-ethanoic acid, and
sodium salts, potassium salts, magnesium salts, calcium salts, aluminum salts, ammonium salts, morpholine salts, pyrine salts and choline salts of the above mentioned free acids.

(2) Naphth[2,1-d]isoxazolyl-3-alkanoic acid esters of the general formula (VIIIc) such as:

3-methoxycarbonylmethyl-4,5-dihydronaphth[2,1-d]isoxazole,
3-ethoxycarbonylmethyl-4,5-dihydronaphth[2,1-d]isoxazole,
3-tert-butoxycarbonylmethyl-4,5-dihydronaphth[2,1-d]isoxazole,
3-ethoxycarbonylmethyl-4,5-dihydronaphth[2,1-d]isoxazole,
3-methoxycarbonylmethyl-4,5-dihydronaphth[2,1-d]isoxazole,
3-methoxycarbonylmethyl-naphth[2,1-d]isoxazole,
3-methoxycarbonylmethyl-6-chloro-7-methoxynaphth[2,1-d]isoxazole,
3-N,N-diethylaminopropyloxycarbonylmethyl-4,5-dihydronaphth[2,1-d]isoxazole, and
3-N,N-diethylaminoethyloxycarbonylmethylnaphth[2,1-d]isoxazole.

(3) 3-carbamoylmethyl-naphth[2,1-d]isoxazoles of the formula (VIIId) such as:

3-carbamoylmethyl-4,5-dihydronaphth[2,1-d)isoxazole,
3-ethylcarbamoylmethyl-4,5-dihydronaphth[2,1-d]isoxazole,
3-N,N-diethylcarbamoylmethyl-4,5-dihydronaphth[2,1-d]isoxazole,
3-N,N-dipropylcarbamoylmethyl-4,5-dihydronaphth[2,1-d]isoxazole,
3-N-butylcarbamoylmethyl-8-methoxy-4,5-dihydronaphth[2,1-]isoxazole,
3-N-norpholino carbonylmethyl-4,5-dihydronaphth[2,1-d]isoxazole,
3-N-pyrrolidino carbonylmethyl-4,5-dihydronaphth[2,1-d]isoxazole,
3-N-piperidino carbonylmethyl-4,5-dihydronaphth[2,1-d]isoxazole,
3-N-piperidinocarbonylmethyl-8-methoxy-4,5-dihydronaphth[2,1-d]isoxazole,
3-carbamoylmethyl-naphth[2,1-d]isoxazole,
3-carbamoylmethyl-6-chloro-7-methoxy-naphth[2,1-d]isoxazole,
3-N,N-dimethylamino proyylcarbamoylmethyl-7-methoxy-4,5-dihydronaphth[2,1-d]isoxazole,
3-N,N-dimethylaminopropylcarbamoylmethyl-8-methoxy-4,5-dihydronaphth[2,1-d]isoxazole, and
3-N,N-dimethylaminoethylcarbamoylmethyl-4,5-dihydronaphth[2,1-d]isoxazole.

This invention will now be illustrated by referring to examples.

EXAMPLE 1

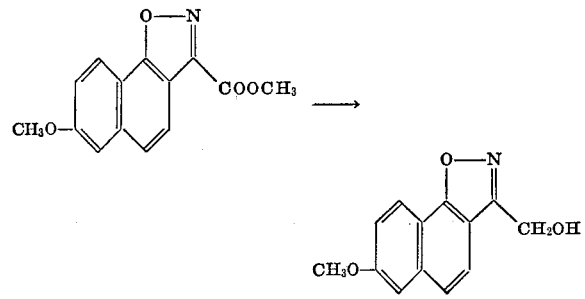

0.93 g. of lithium aluminum hydride was suspended in 100 ml. of tetrahydrofuran. Separately, 6.4 g. of 7-methoxy - 3 - methoxycarbonylnaphtha[2,1-d]isoxazole were dissolved in 100 ml. of tetrahydrofuran. The solution of 7-methoxy-3-methoxycarbonylnaphth[2,1-d]isoxazole dissolved in tetrahydrofuran was added into the suspension of lithium aluminum hydride in tetrahydrofuran dropwise. Then, the mixture was heated under reflux for 3 hours. After completion of the reaction, the solution was cooled to room temperature and the excessive lithium aluminum hydride was decomposed. Then the resulting inorganic substances were removed. After distilling off the tetrahydrofuran, the residue was recrystallized from methanol. Thus, 5.2 g. of 3-hydroxymethyl-7-methoxynaphth[2,1-d]isoxazole having a melting point of 151–153° C. were obtained as white platelets crystals.

[IR $\nu_{OH}^{KBr}$ 3410 cm.$^{-1}$].

7 - methoxy - 3-methoxycarbonyl-naphth[2,1-d]isoxazole used as the starting compound was prepared by the following method:

1.5 g. of 6 - methoxy-1-oxo-1,2,3,4-tetrahydro-2-naphthylglyoxylic acid methyl ester and 1.2 g. of powdered hydroxyl amine hydrochloride were added to 10 ml. of glacial acetic acid, and the mixture was heated under agitation for 10 minutes on a bath maintained at 165° C. Boiling water was added to the mixture until white precipitates were formed, followed by cooling with ice, filtration and water-washing. Recrystallization from ethyl acetate gave 1.35 g. of 7 - methoxy-3-methoxycarbonyl-naphth[2,1-d]isoxazole.

EXAMPLE 2

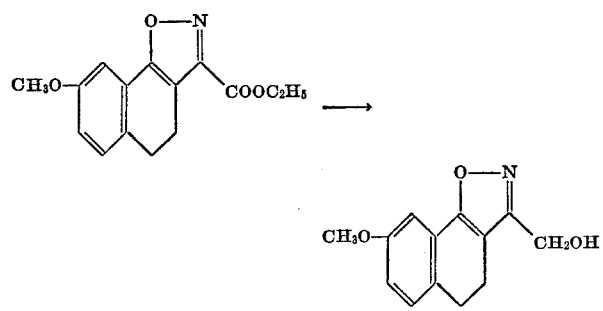

5.6 g. of 3 - ethoxycarbonyl - 8-methoxy-4,5-dihydronaphth[2,1-d]isoxazole and 0.8 g. of lithium aluminum hydride were added to 100 ml. of tetrahydrofuran, followed by heating on a bath for about 2 hours. After cooling, the reaction mixture was treated with ethyl acetate and hydrochloric acid, and extracted with ether. The ether layer was treated by a customary method and then the solvent was distilled off. The recrystallization of the residue from acetone gave 3.7 g. of 3-hydroxymethyl-8-methoxy - 4,5 - dihydronaphth[2,1-d]isoxazole having a melting point of 81–83° C.

EXAMPLE 3

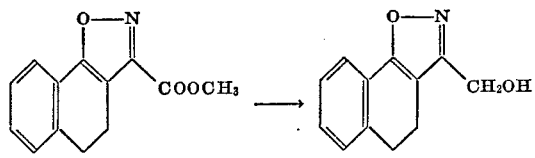

23 g. of 3-methoxycarbonyl-4,5-dihydronaphth[2,1-d]isoxazole were dissolved into 100 ml. of tetrahydrofuran, and 15 ml. of 70% solution of sodium dihydro-bis (2-methoxy) aluminate dissolved in benzene were added to the above solution with stirring. Then, the mixture was stirred for about 1 hour. Then, water was added to the mixture, and the system was treated with 10% hydrochloric acid, followed by extraction with ether. The ether solution was washed with water and after drying with salt cake, the ether was distilled off, and the residue was recrystallized from acetone. Thus, 15.4 g. of 3-hydroxymethyl-4,5-dihydronaphth[2,1-d]isoxazole having a melting point of 91–93° C. were obtained as colorless needle-like crystals.

EXAMPLE 4

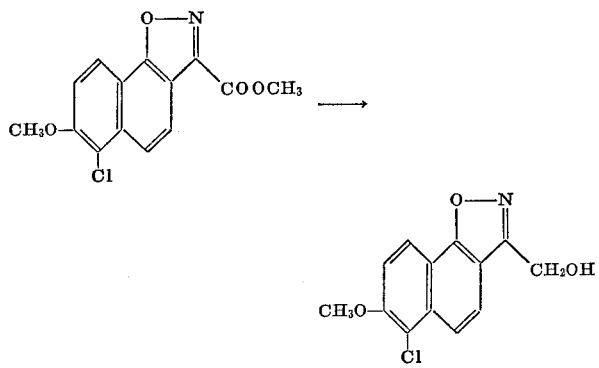

3.0 g. of 6-chloro-7-methoxy - 3 - methoxycarbonyl-naphth[2,1-d]isoxazole was dissolved in 150 ml. of anhydrous tetrahydrofuran, and 0.22 g. of lithium aluminum hydride were added to the solution with stirring, and the mixture was heated for 4 hours. After cooling the reaction mixture to room temperature, it was treated with 10% sulfuric acid solution. Then, the reacted solution was extracted with 150 ml. of chloroform, and after drying over salt cake and distilling off the solvent, white crystals were obtained. The recrystallization of the crystals from tetrahydrofuran-ethanol gave 2.0 g. of 6-chloro-3-hydroxymethyl-7-methoxynaphth[2,1-d]isoxazole having a melting point of 210–211° C. as colorless scale-like crystals.

The results of the examination of the infrared absorption spectrum and of the elementary analysis of the so obtained compound are as follows:

Infrared absorption spectrum:

$\nu_{OH}^{KBr}$ 3380 cm.$^{-1}$.

Elementary analysis values: Calculated (percent): C, 59.20; H, 3.80; N, 5.31. Measured (percent): C, 59.01; H, 3.72; N, 5.11.

EXAMPLE 5

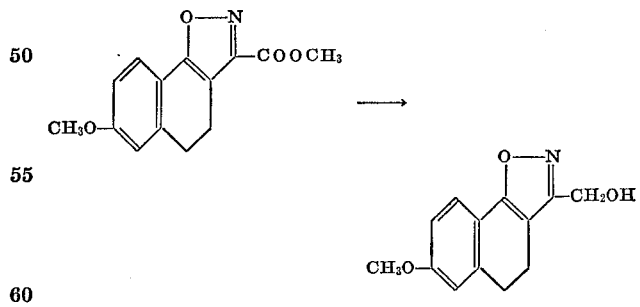

5.61 g. of 3-methoxycarbonyl-7-methoxy-4,5-dihydronaphth[2,1-d]isoxazole were dissolved in 100 ml. of tetrahydrofuran, to which 0.76 g. of lithium aluminum hydride was added. This solution was heated on a water bath for 2 hours. After cooling, a small amount of ethyl acetate was added to the reaction mixture to decompose the unreacted lithium aluminum hydride, and then ether was added for extraction after making the system acidic with hydrochloric acid. The ether layer was dried with salt cake and the solvent was distilled off. The recrystallization of the residue from methanol gave 4.1 g. of 3-hydroxymethyl - 7 - methoxy - 4,5 - dihydronaphth[2,1-d]isoxazole having a melting point of 108–111° C. as colorless, platelet-like crystals.

EXAMPLE 6

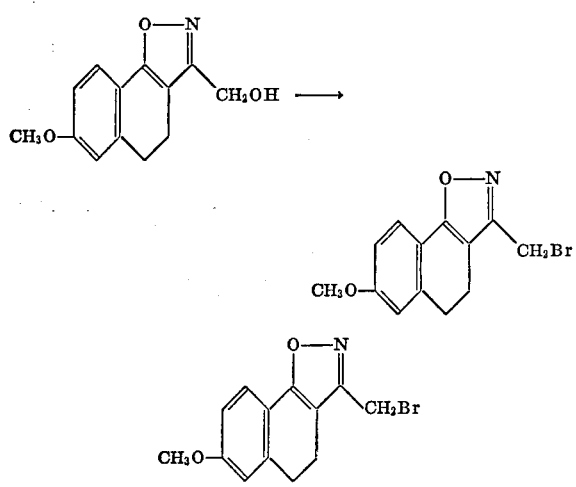

4.6 g. of 3-hydroxymethyl - 7 - methoxy-4,5-dihydronaphth[2,1-d]isoxazole were dissolved in 50 ml. of chloroform, and 8.1 g. of phosphorus tribromide were added to the solution dropwise. Then, the solution was heated on a water bath for 1 hour and was concentrated under reduced pressure. The resulting residue was recrystallized from benzene and petroleum ether. Thus, 3.2 g. of 3-bromomethyl-7-methoxy - 4,5-dihydronaphth[2,1-d]isoxazole having a melting point of 91–93° C. were obtained.

EXAMPLE 7

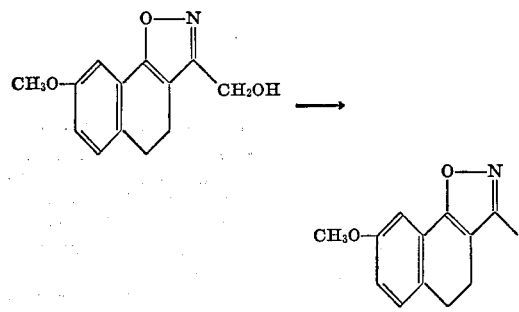

4.6 g. of 3-hydroxymethyl - 8 - methoxy-4,5-dihydronaphth[2,1-d]isoxazole and 9 g. of phosphorus tribromide were added into dried chloroform, and the mixture was treated by the same procedures as adopted in Example 2 for preparing the starting compound. Thus, 4.5 g. of 3-bromomethyl - 8-methoxy - 4,5 - dihydronaphth[2,1-d]isoxazole having a melting point of 94–96° C. were obtained.

EXAMPLE 8

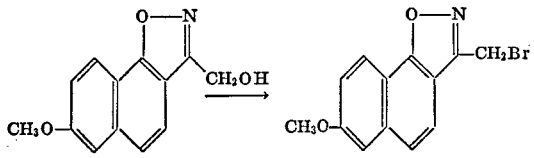

4.2 g. of the so obtained 3-hydroxymethyl-7-methoxynaphth[2,1-d]isoxazole were dissolved in 50 ml. of chloroform, and to the solution 8 g. of phosphorus tribromide were added dropwise. Then, the mixture was heated on a water bath for 1 hour, and was concentrated under reduced pressure. The remaining residue was recrystallized from benzene. Thus, 3.8 g. of 3-bromomethyl-7-methoxynaphth[2,1-d]isoxazole having a melting point of 208–210° C. were obtained.

EXAMPLE 9

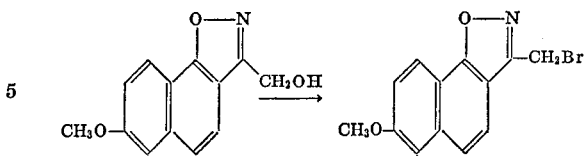

4.7 g. of 6-chloro-3-hydroxymethyl-7-methoxynaphth[2,1-d]isoxazole were dissolved in 50 ml. of chloroform, and 8 g. of phosphorus tribromide were added dropwise to the solution. Then, the solution was heated on a water bath for 1 hour, and was concentrated under reduced pressure. When the resulting residue was recrystallized from benzene, 4.5 g. of 6-chloro-3-bromomethyl-7-methoxynaphth[2,1-d]isoxazole having a melting point of 203–205° C. were obtained as colorless, needle-like crystals. The ultraviolet absorption spectrum of the compound was as follows:

$\lambda_{max.}^{EtOH}$ 253 m$\mu$ ($\epsilon$: 22,000); 298 m$\mu$ ($\epsilon$: 6,600); 329 m$\mu$ ($\epsilon$: 3,900); 344 m$\mu$ ($\epsilon$: 4,100).

EXAMPLE 10

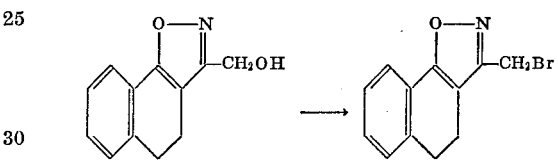

16.08 g. of 3-hydroxymethyl-4,5-dihydronaphth[2,1-d]isoxazole and 24.4 g. of phosphorus tribromide were treated in 100 ml. of chloroform, by the same procedures as described in Example 6 for preparing the starting compound. Thus, 11.5 g. of 3-bromomethyl-4,5-dihydronaphth[2,1-d]isoxazole having a melting point of 87–90° C. were obtained.

EXAMPLE 11

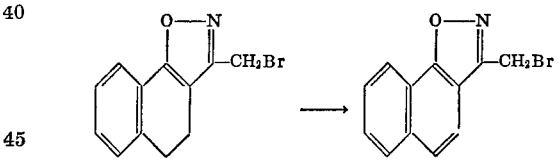

2.6 g. of 3-bromomethyl-4,5-dihydronaphth[2.1 - d]isoxazole were dissolved into 50 ml. of carbon tetrachloride, and to this solution, 12 g. of phosphorus pentachloride were added, and the solution was refluxed on a water bath for 16 hours. The reaction mixture was thrown into water, and the precipitates formed as crystals were collected by filtration, dried and recrystallized from tetrahydrofuran. Thus, 1.8 g. of 3-bromomethyl-naphth[2,1-d]isoxazole having a melting point of 185–187° C. were obtained as white needle-like crystals.

The results of the examination of infrared and ultraviolet absorption spectra of the above compound are as follows:

Infrared absorption spectrum:

$\nu_{C=O}^{KBr}$ 1750 cm.$^{-1}$.

Ultra-violet absorption spectrum:

$\lambda_{max.}^{CHCl_3}$ 258 m$\mu$ ($\epsilon$: 21,500); 343 m$\mu$ ($\epsilon$: 5,300).

EXAMPLE 12

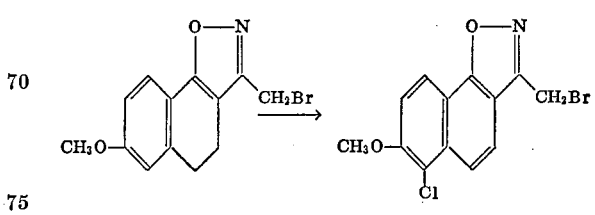

2.94 g. of 3-bromomethyl-7-methoxy-4,5-dihydronaphth[2,1-d]isoxazole were dissolved in 50 ml. of chloroform, and 4.5 g. of phosphorus pentachloride were added to the solution, followed by heating under reflux for 3 hours at the temperature corresponding to the boiling point of chloroform. After completion of the reaction, the reaction mixture was thrown into ice and the chloroform layer was recovered by separation. After washing with water and drying, chloroform was distilled off, and the residue was recrystallized from chloroform and methanol. Thus, 1.6 g. of 6-chloro-3-bromomethyl-7-methoxynaphth[2,1-d]isoxazole having a melting point of 203–206° C. was obtained as colorless needle-like crystals. The ultra-violet absorption spectrum of the so obtained compound is as follows:

$\lambda_{max.}^{EtOH}$ 253 m$\mu$ ($\epsilon$: 22,000); 298 m$\mu$ ($\epsilon$: 6,600); 329 m$\mu$ ($\epsilon$: 3,900); 344 m$\mu$ ($\epsilon$: 4,100).

EXAMPLE 13

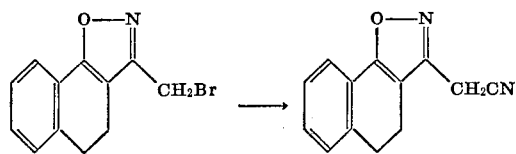

5.3 g. of 3-bromomethyl - 4,5 - dihydronaphth[2,1-d]isoxazole and 2.9 g. of sodium cyanide were heated under reflux for 4 hours in 100 ml. of ethanol. After completion of the reaction, the reaction mixture was thrown into about 500 ml. of water, and the formed crystals were recrystallized from ethanol. Thus, 2.9 g. of 3-cyanomethyl-4,5-dihydronaphth[2,1-d]isoxazole having a melting point of 78–80° C. were obtained as white platelet-like crystals. The results of the examination of the infrared absorption spectrum and of the elementary analysis of the so formed compound are as follows:

Infrared absorption spectrum:

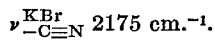 2175 cm.$^{-1}$.

EXAMPLE 14

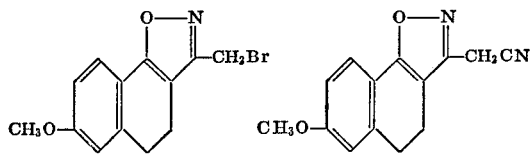

13.2 g. of 3 - bromomethyl - 7 - methoxy - 4,5 - dihydronaphth[2,1-d]isoxazole and 4.9 g. of sodium cyanide were heated under reflux for 4 hours in 100 ml. of ethanol. After completion of the reaction, the reaction mixture was thrown into about 500 ml. of water, and the formed crystals were recrystallized from methanol. Thus, 8.9 g. of 3 - cyanomethyl-7-methoxy-4,5-dihydronaphth[2,1-d]isoxazole having a melting point of 118–121° C. were obtained as white needle-like crystals. The results of the examination of the infrared absorption spectrum and of the elementary analysis of the so formed compounds are as follows:

Infrared absorption spectrum:

IR 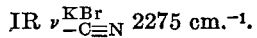 2275 cm.$^{-1}$.

EXAMPLE 15

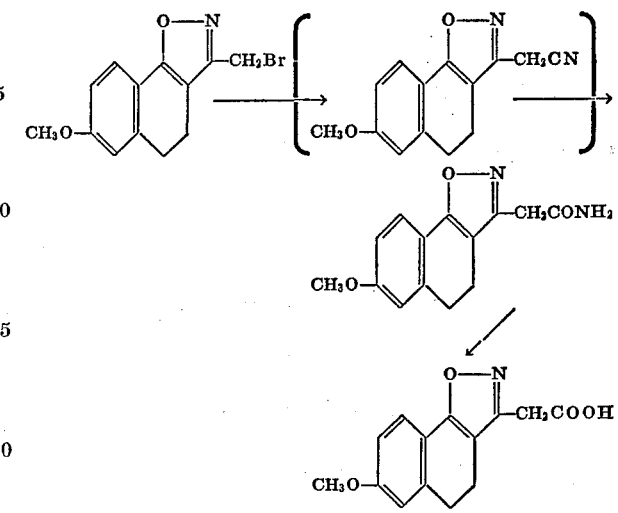

6.08 g. of 3 - bromomethyl - 7 - methoxy - 4,5 - dihydronaphth[2,1-d]isoxazole and 2.94 g. of sodium cyanide were added to 100 ml. of a mixed solution of equal volumes of ethanol and water, and the mixture was heated on a water bath for 7 hours. After cooling, the reaction mixture was thrown into 500 ml. of water, and the precipitated crude crystal was collected by filtration and recrystallized from benzene. Thus, 4.08 g. of 3-carbamoylmethyl-7-methoxy - 4,5 - dihydronaphth[2,1-d]isoxazole melting at 185–187° C. were obtained.

The infrared absorption spectrum of the so obtained compound was as follows:

$\nu_{NH}^{KBr}$ 3250 cm.$^{-1}$, 3420 cm.$^{-1}$.

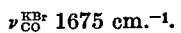 1675 cm.$^{-1}$.

2.6 g. of the so obtained 3-carbamoylmethyl-7-methoxy-4,5-dihydronaphth[2,1-d]isoxazole were added to a solution which was made by dissolving 4 g. of sodium hydroxide in a mixed liquor of 30 ml. of methanol and 30 ml. of water, and the mixture was heated on a water bath for 3 hours to conduct the hydrolysis. Thereafter, the reaction mixture was thrown into a great quantity of water, followed by filtration. The filtrate was made acidic by addition of hydrochloric acid, the formed precipitates were collected as crude crystals by filtration and the precipitates were recrystallized from methanol. Thus, 2 g. of 3-hydroxycarbonylmethyl-7-methoxy-4,5-dihydronaphth[2,1-d]isoxazole having a melting point of 166–167° C. were obtained.

The starting compound was synthesized in the following manner:

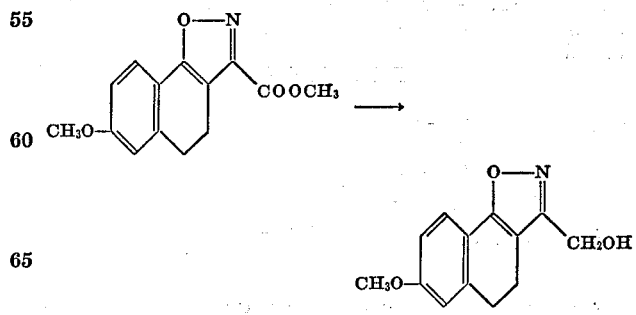

5.61 g. of 3-methoxycarbonyl - 7 - methoxy-4,5-dihydronaphth[2,1-d]isoxazole were dissolved in 100 ml. of tetrahydrofuran, to which 0.76 g. of lithium aluminum hydride was added. This solution was heated on a water bath for 2 hours. After cooling, a small amount of ethyl acetate was added to the reaction mixture to decompose the unreacted lithium aluminum hydride, and then ether was added for extraction after making the system acidic with hydrochloric acid. The ether layer was dried with salt cake and the solvent was distilled off. The recrystallization of the residue from methanol gave 4.1 g. of 3-hydroxymethyl-7-methoxy - 4,5 - dihydrinaphth[2,1-d]isoxazole having a melting point of 108–111° C. as colorless, platelet-like crystals.

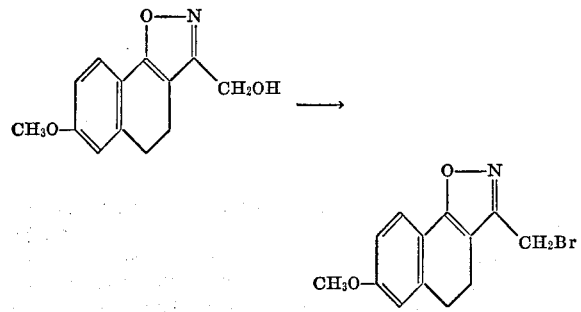

4.6 g. of 3 - hydroxymethyl - 7 - methoxy-4,5-dihydronaphth[2,1-d]isoxazole were dissolved in 50 ml. of chloroform, and 8.1 g. of phosphorus tribromide were added to the solution dropwise. Then, the solution was heated on a water bath for 1 hour and was concentrated under reduced pressure. The resulting residue was recrystallized from benzene and petroleum ether. Thus, 3.2 g. of 3-bromomethyl - 7 - methoxy - 4,5 - dihydronaphth[2,1-d]isoxazole having a melting point of 91–93° C. were obtained.

EXAMPLE 16

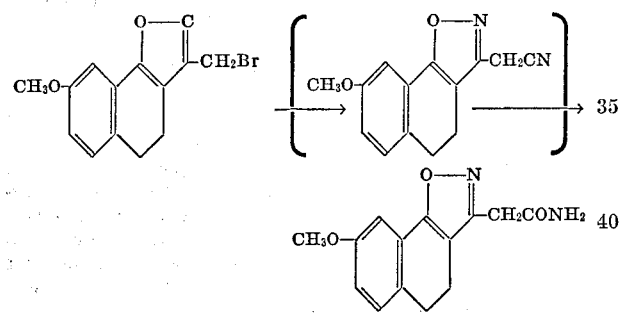

6.1 g. of 3-bromomethyl-8-methoxy-4,5-dihydronaphth-[2,1-d]isoxazole and 3 g of potassium cyanide were added to 100 ml. of a mixed solution equal volumes of methanol and water, and the mixture was heated on a water bath for 7 hours. After cooling, the reaction mixture was thrown into a great quantity of water, and the precipitates formed as crude crystals were collected by filtration. Thus, 3.9 g. of 3-carbamoylmethyl-8-methoxy-4,5-dihydronaphth[2,1-d]soxazole having a melting point of 194–196° C. were obtained.

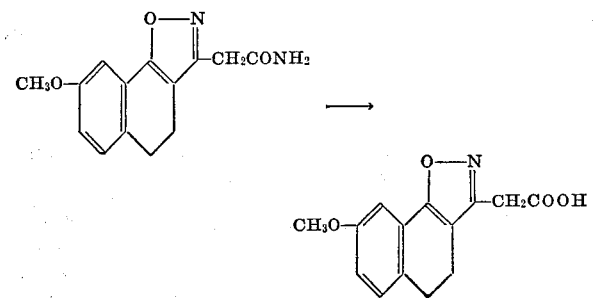

2.58 g. of the so obtained 3-carbamoylmethyl-8-methoxy-4,5-dihydronaphth[2,1-d]isoxazole were added to a solution which was prepared by mixing 20 ml. of ethanol with a solution of 3.42 g. of potassium hydroxide in 40 ml. of water, and the resulting solution was subjected to hydrolysis for 2 hours by heating on a water bath. Then, the reaction solution was thrown into 300 ml. of water and was filtered. The filtrate was made acidic with hydrochloric acid, and the precipitates formed as crude crystals were collected by filtration and recrystallized from methanol. Thus, 2.1 g. of 3-hydroxycarbonylmethyl-8-methoxy-4,5-dihydronaphth[2,1-d]isoxazole having a melting point of 186–188° C. were obtained.

(Infrared absorption spectrum:

$\nu_{CO}^{KBr}$ 1720 cm.$^{-1}$).

EXAMPLE 17

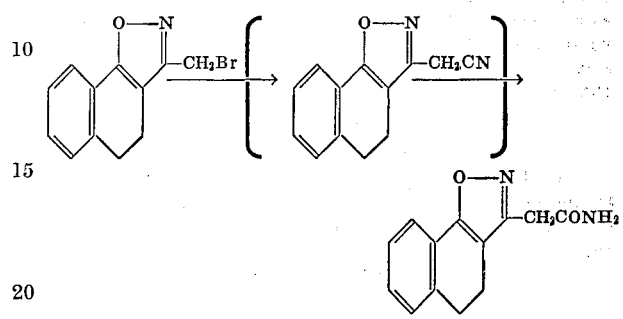

5.28 g. of 3 - bromomethyl-4,5-dihydronaphth[2,1-d] isoxazole and 3 g. of sodium cyanide were added into 100 ml. of hydrous alcohol, and the solution was heated on a water bath for 5 hours. After completion of the reaction, the reaction mixture was through into water, and the precipitates formed as crude crystals were collected by filtration and recrystallized from benzene. Thus, 3.75 g. of 3-carbamoylmethyl - 4,5 - dihydronaphth[2,1-d]isoxazole having a melting point of 165–167.5° C. were obtained.

The infrared absorption spectrum of the so obtained compound was as follows:

$\nu_{NH}^{KBr}$ 3240 cm.$^{-1}$, 3430 cm.$^{-1}$.
$\nu_{CO}^{KBr}$ 1670 cm.$^{-1}$.

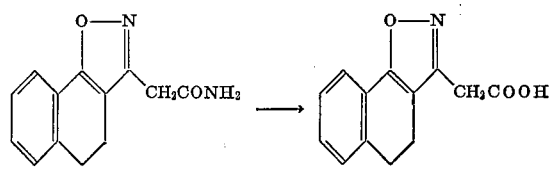

2.3 g. of so obtained 3-carbamoylmethyl-4,5-di-hydronaphth[2,1-d]isoxazole were added into a mixed solution of 40 ml. of 10% aqueous solution of potassium hydroxide and 20 ml. of ethanol, followed by heating on a water bath for 2 hours. After completion of the reaction, the reaction mixture was thrown into water and made acidic with hydrochloric acid. The precipitates formed as crude crystals were recrystallized from acetone. Thus, 2.01 g. of 3-hydroxycarbonylmethyl-4,5-dihydronaphth[2,1-d]isoxazole having a melting point of 180–183° C. were obtained.

(Infrared absorption spectrum:

$\nu_{C=O}^{KBr}$ 1725 cm.$^{-1}$).

EXAMPLE 18

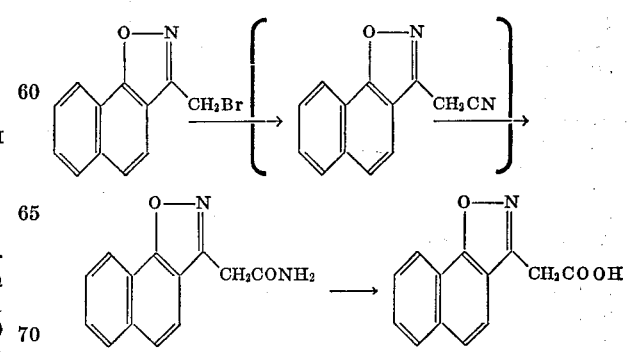

5.2 g. of 3-bromomethyl-naphth[2,1-d]isoxazole and 2.0 g. of sodium cyanide were heated under reflux for 5 hours in a mixed solution of 50 ml. of ethanol and 20 ml. of water. After completion of the reaction, the reaction mixture was thrown into 300 ml. of water, and the precipitates formed as crystals were collected by filtration. Thus 4.1 g. of 3-carbamoylmethylnaphth[2,1-d]isoxazole were obtained as crystals. This compound was heated for 1 hour together with 1.6 g. of sodium hydroxide, 30 ml. of methanol and 50 ml. of water for hydrolysis. After completion of the reaction, the reaction mixture was made acidic with hydrochloric acid and the precipitates were formed as white crystals. The recrystallization of the so obtained white crystals from methanol gave 3.2 g. of naphth[2,1-d] isoxazolyl-ethanoic acid having a melting point of 182–185° C.

[IR $\nu_{C=O}^{KBr}$ 1725 cm.$^{-1}$.]

The starting compound was obtained by treating 3-bromomethyl - 4,5 - dihydronaphth[2,1-d]isoxazole with chloranil or phosphorus pentachloride in carbon tetrachloride.

EXAMPLE 19

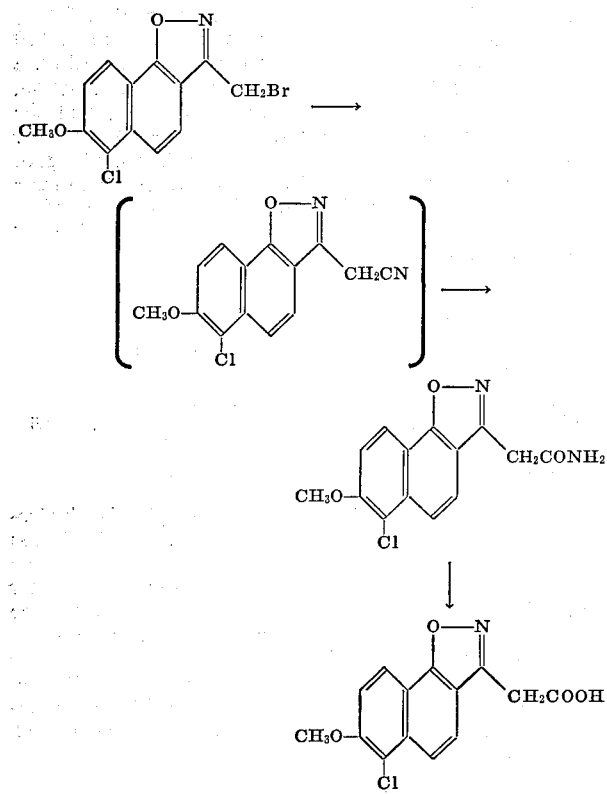

6.5 g. of 3 - bromomethyl-6-chloro-7-methoxynaphth [2,1-d]isoxazole and 2.0 g. of sodium cyanide were heated under reflux for 5 hours in a mixed solution of 50 ml. of ethanol and 20 ml. of water. After completion of the reaction, the reaction mixture was thrown into 300 ml. of water, and the precipitates formed as crystals were collected by filtration. Thus 4.8 g. of 3-carbamoylmethyl-6-chloro-7-methoxynaphth[2,1-d]isoxazole were obtained. The crystals were heated for 1 hour together with 1.6 g. of sodium hydroxide, 30 ml. of methanol and 50 ml. of water for performing the hydrolysis reaction. After completion of the reaction, the reaction mixture was made acidic with hydrochloric acid to precipitate white crystals. The so formed crystal precipitates were recrystallized from methanol. Thus, 3.0 g. of 6-chloro-7-methoxynaphth[2,1-d] isoxazolyl-ethanoic acid having a melting point of 179–181° C. were obtained as white platelet-like crystals.

[IR $\nu_{max}^{KBr}$ cm.$^{-1}$ 1718 (C=O).]

EXAMPLE 20

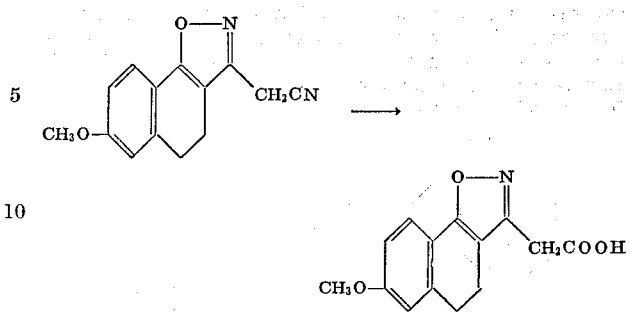

3 g. of 3-cyanomethyl-7-methoxy-4,5-dihydronaphth-[2,1-d]isoxazole were added to 100 ml. of a mixed solution of equal volumes of ethanol and 10% aqueous solution of sodium hydroxide, and then the mixture was heated on a water bath for 3 hours. After cooling, the reaction mixture was thrown into 500 ml. of water, and the formed crystals were separated by filtration. When the filtrate was made acidic with hydrochloric acid, 2.5 g. of 7-methoxy-4,5-dihydronaphth[2,1-d]isoxazolyl-3-ethanoic acid were obtained. The recrystallization of the compound from methanol-benzene gave colorless needle-like crystals having a melting point of 164–167° C.

EXAMPLE 21

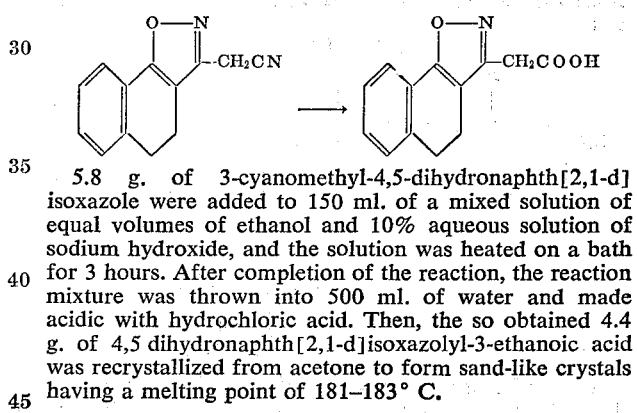

5.8 g. of 3-cyanomethyl-4,5-dihydronaphth[2,1-d] isoxazole were added to 150 ml. of a mixed solution of equal volumes of ethanol and 10% aqueous solution of sodium hydroxide, and the solution was heated on a bath for 3 hours. After completion of the reaction, the reaction mixture was thrown into 500 ml. of water and made acidic with hydrochloric acid. Then, the so obtained 4.4 g. of 4,5 dihydronaphth[2,1-d]isoxazolyl-3-ethanoic acid was recrystallized from acetone to form sand-like crystals having a melting point of 181–183° C.

EXAMPLE 22

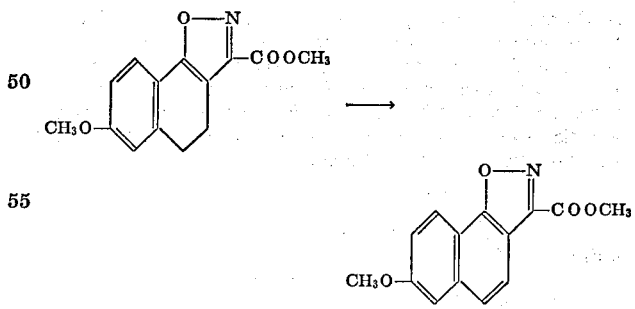

2.6 g. of 7-methoxy-3-methoxycarbonyl-4,5-dihydronaphth[2,1-d]isoxazole were dissolved in 50 ml. of carbon tetrachloride, and to the solution 12 g. of phosphorus pentachloride were added. After heating under reflux on a water bath for 16 hours, the reaction mixture was poured into ice water. The formed crystal precipitates were collected by filtration, dried and recrystallized from tetrahydrofuran. Thus, 1.8 g. of 7-methoxy-3-methoxy-carbonylnaphth[2,1-d]isoxazole was obtained as white needle-like crystals.

The results of examination of infrared and ultra-violet absorption spectra and of the elemental analysis of the so obtained compound are as follows:
Infrared absorption spectrum:

$\nu_{C=O}^{KBr}$ 1750 cm.$^{-1}$.

Ultra-violet absorption spectrum:

$\lambda_{max.}^{CHCl_3}$ 259 m$\mu$ ($\epsilon$: 21,000); 343 m$\mu$ ($\epsilon$: 5,300).

Elemental analysis values: Calculated (percent): C, 65.37; H, 4.28; N, 5.45. Measured (percent): C, 65.59; H, 4.21; N, 5.39.

EXAMPLE 23

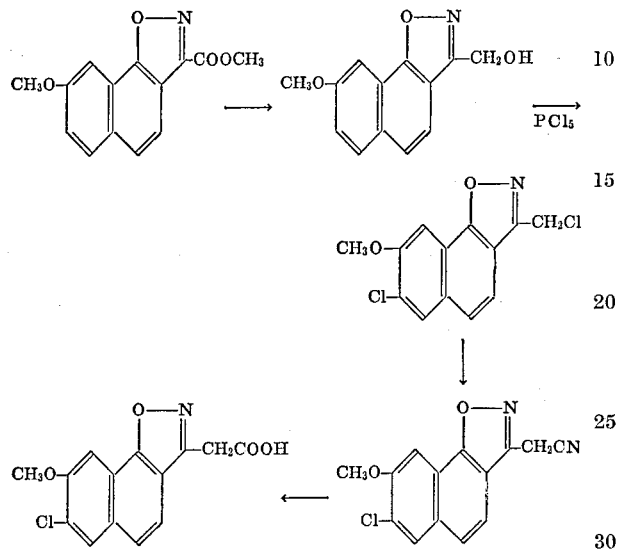

2.0 g. of 8-methoxy-3-methoxycarbonylnaphth[2,1-d]isoxazole were dissolved in 50 ml. of anhydrous tetrahydrofuran, and 0.19 g. of lithium aluminum hydride powder was added to the solution with stirring. Then, the mixture was heated under reflux for 3 hours. After cooling the solution to room temperature, it was treated with 10% sulfuric acid solution. Then, 50 ml. of benzene were added to the reaction mixture for extraction, and after drying over anhydrous sodium sulfate, the solvent was distilled off. The formed crystals were recrystallized from methanol. Thus, 1.5 g. of 3-hydroxymethyl-8-methoxynaphth[2,1-d]isoxazole having a melting point of 153–155° C. were observed as white prism-like crystals. The compound exhibited an absorption at

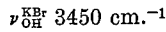 3450 cm.$^{-1}$ in the infrared absorption spectrum. The elementary analysis values of the so obtained compound are as follows:

Calculated (percent): C, 68.11; H, 4.84; N, 6.11. Measured (percent): C, 67.92; H, 4.80; N, 5.95.

4.2 g. of 3-hydroxymethyl-8-methoxynaphth[2,1-d]isoxazole obtained in accordance with the above method were dissolved in 50 ml. of chloroform, and 17 g. of phosphorus pentachloride were added to the solution. The solution was heated under reflux on a water bath for 16 hours. Then, the reaction mixture was poured into ice water, and the formed crystals were collected by filtration, dried and recrystallized from tetrahydrofuran. Thus, 4.0 g. of 7-chloro-3-chloromethyl-8-methoxynaphth[2,1-d]isoxazole having a melting point of 214–217° C. were obtained. The ultra-violet absorption spectrum of the compound was as follows:

$\lambda_{max.}^{EtOH}$ 251 m$\mu$ ($\epsilon$=21,500); 298 m$\mu$ ($\epsilon$=6,500); 328 m$\mu$ ($\epsilon$=4,000); 345 m$\mu$ ($\epsilon$=4,100).

The so obtained 7-chloro-3-chloromethyl-8-methoxynaphth[2,1-d]isoxazole was treated in the same manner as described in Examples 15–20. Thus, 2.5 g. of 7-chloro-8-methoxynaphth[2,1-d]isoxazolyl-3-ethanoic acid having a melting point of 201–204° C. were obtained, and it exhibited an absorption at

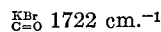 1722 cm.$^{-1}$ in the infrared absorption spectrum.

EXAMPLE 24

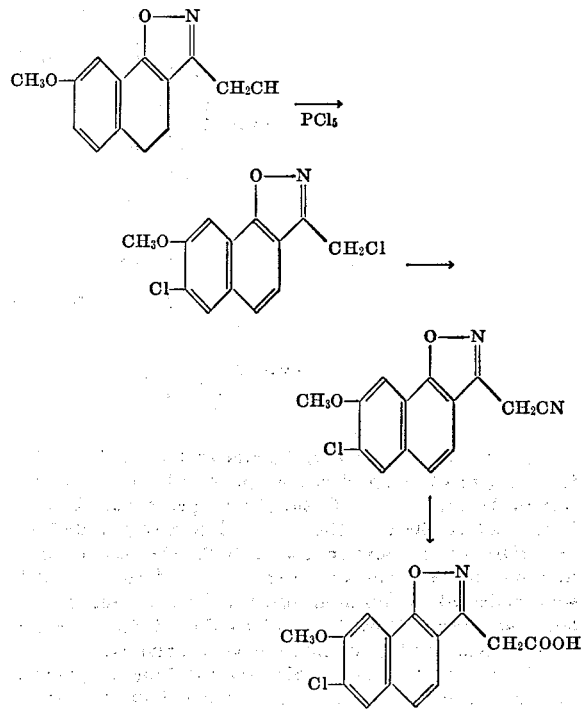

2.1 g. of 3-hydroxymethyl-8-methoxy-4,5-dihydronaphth[2,1-d]isoxazole were dissolved in 50 ml. of chloroform, and 17 g. of phosphorus pentachloride were added thereto. Then, the solution was heated under reflux on a water bath for 16 hours, and the reaction mixture was poured into ice water. The formed crystals were collected by filtration, dried and recrystallized from tetrahydrofuran. Thus, 2.0 g. of 7-chloro-3- chloromethyl-8-methoxynaphth[2,1-d]isoxazole melting at 214–217° C. were obtained and it exhibited the following absorptions in the ultra-violet absorption spectrum:

$\lambda_{max.}^{EtOH}$ 251 m$\mu$ ($\epsilon$=21,500); 298 m$\mu$ ($\epsilon$=6,500); 328 m$\mu$ ($\epsilon$=4,000); 345 m$\mu$ ($\epsilon$=4,100).

8.02 g. of 7-chloro-3-chloromethyl-8-methoxynaphth[2,1-d]isoxazole prepared in accordance with the above method were disolved in a mixed solution of equal volumes of water and ethanol together with 5 g. of sodium cyanide, and the mixture was treated in the same manner as described in Examples 15–20. Thus, 4.5 g. of 7-chloro-8-methoxynaphth[2,1-d]isoxazolyl-3-ethanoic acid having a melting of 203° C. were obtained.

EXAMPLE 25

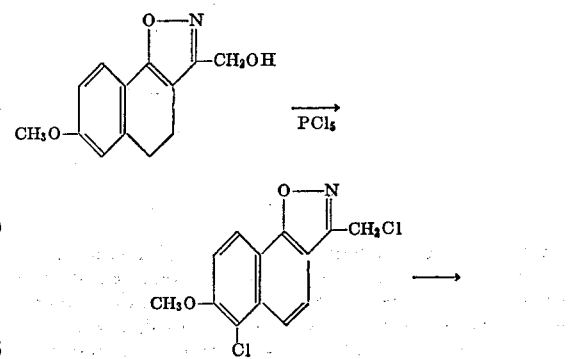

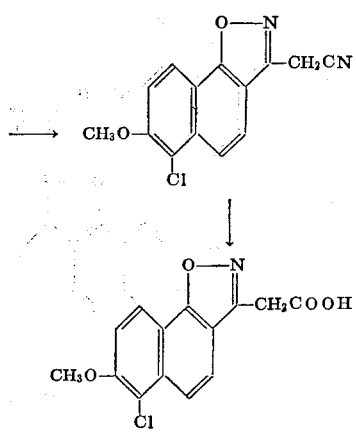

2 g. of 3-hydroxymethyl-7-methoxy-4,5-dihydronaphth[2,1-d]isoxazole were dissolved in 50 ml. of carbon tetrachloride, and 15 g. of phosphorus pentachloride were further added thereto. Then, the solution was heated under reflux for 16 hours on a water bath. The reaction mixture was poured into ice water, and the formed crystals were collected by filtration, dried and recrystallized from tetrahydrofuran. Thus, 1.9 g. of 6-chloro-3-chloromethyl-7-methoxynaphth[2,1-d]isoxazole were obtained.

1.9 g. of 6-chloro-3-chloromethyl-7-methoxynaphth[2,1-d]isoxazole prepared in accordance with the above method were dissolved in a mixed solution of equal volumes of water and methanol together with 1.5 g. of sodium cyanide, and the mixture was treated in the same manner as described in Examples 15–20. Thus, 1.1 g. of 3-hydroxycarbonylmethyl-6-chloro - 7 - methoxynaphth[2,1-d]isoxazole melting at 179–181° C. were obtained, and it exhibited an absorption at $\nu_{C=O}^{KBr}$ 1718 cm.$^{-1}$ in the infrared absorption spectrum.

EXAMPLE 26

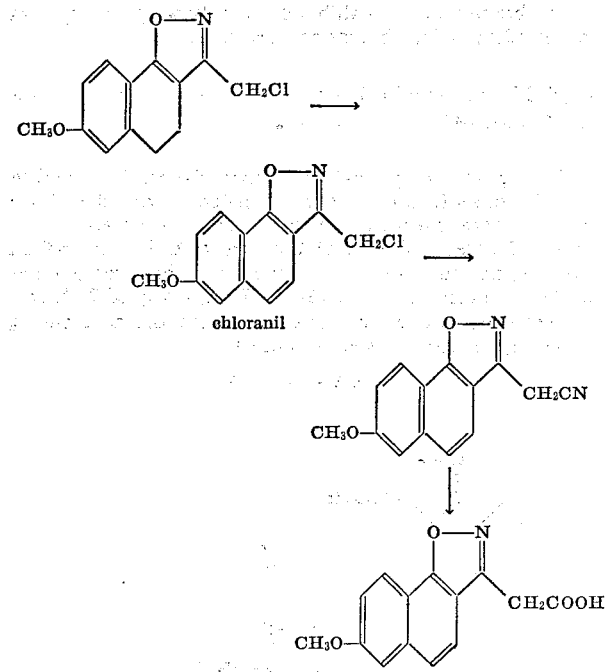

4.95 g. of 3-chloromethyl-7-methoxy-4,5-dihydronaphth[2,1-d]isoxazole and 10 g. of chloranil were heated under reflux for 15 hours in 100 ml. of xylene. After completion of the reaction, the solution was washed with 10% aqueous ammonia and then with water, and was dried over salt cake. Then, the solvent was distilled off and the residue was recrystallized from methanol. Thus, 2.75 g. of 3-chloromethyl - 7 - methoxynaphth[2,1-d]isoxazole having a melting point of 132–134° C., were obtained as white needle-like crystals and its exhibited the following absorptions in the ultraviolet absorption spectrum UV $\lambda_{max.}^{EtOH}$ 228 m$\mu$ ($\epsilon=17,000$); 250 m$\mu$ ($\epsilon=22,000$); 288 m$\mu$ ($\epsilon=14,000$); 336 m$\mu$ ($\epsilon=2,000$).

The elementary analysis values of the above compound are as follows:

Calculated (percent): C, 53.04; H, 4.07; N,5.66. Measured (percent): C, 62.98; H, 4.21; N, 5.69.

2.5 g. of 3-chloromethyl-7-methoxynaphth[2,1-d]isoxazole obtained by the above method and 1.7 g. of sodium cyanide were dissolved in a mixed solution of water and ethanol, and the solution was treated in the same manner as described in Examples 15–20. Thus, 1.2 g. of 7-methoxynaphth[1,2-d]isoxazolyl-3-ethanoic acid having a melting point of 189–191° C. were obtained and it exhibited an absorption at $\nu_{C=O}^{KBr}$ 1720 cm.$^{-1}$ in the infrared absorption spectrum.

EXAMPLE 27

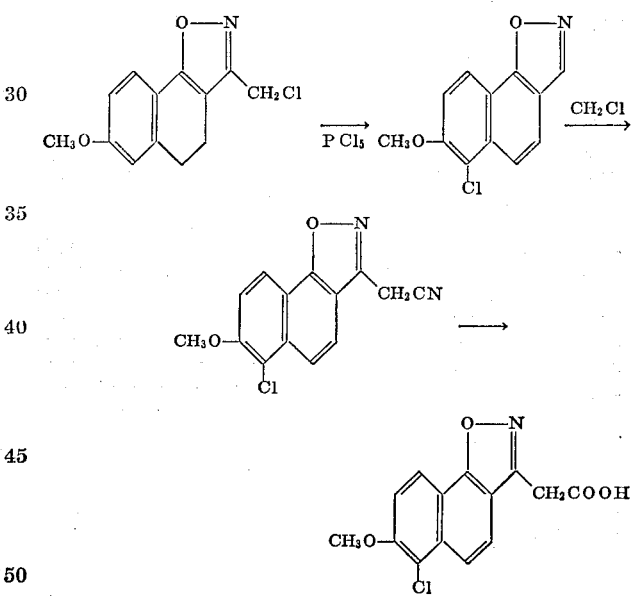

2.5 g. of 3-chloromethyl-7-methoxy-4,5-dihydronaphth[2,1-d]isoxazole were dissolved in 50 ml. of chloroform, and 4.5 g. of phosphorus pentachloride were added thereto. Then, the solution was heated under reflux for 3 hours at the temperature corresponding to the boiling point of chloroform. After completion of the reaction, the reacted mixture was poured into ice water, and the chloroform layer was separated, and the chloroform was distilled off according to a customary method. The resulting crude crystals were recrystallized from a mixed solvent of chloroform and methanol. Thus, 1.8 g. of 6-chloro-3-chloromethyl - 7 - methoxynaphth[2,1-d]isoxazole melting at 212–214° C. were observed as colorless needle-like crystals and exhibited the following absorptions in the ultra-violet absorption spectrum:

$\lambda_{max.}^{EtOH}$ 230 m$\mu$ ($\epsilon=25,000$); 252 m$\mu$ ($\epsilon=39,000$); 292 m$\mu$ ($\epsilon=16,500$); 344 m$\mu$ ($\epsilon=3,900$).

4.5 g. of 6-chloro-3-chloromethyl-7-methoxynaphth[2,1-d]isoxazole obtained by the above method and 2.0 g. of potassium cyanide were dissolved in a mixed solution of equal volumes of water and ethanol, and the mixture was treated in the same manner as described in Examples 15–20. Thus, 3.1 g. of 6-chloro-3-hydroxycarbonylmethyl-7- methoxynaphth[2,1-d]isoxazole having a melting point of 179–181° C. were observed and exhibited an absorption at $$\nu_{C=O}^{KBr} \ 1718 \ cm.^{-1}$$

in the infrared absorption spectrum.

EXAMPLE 28

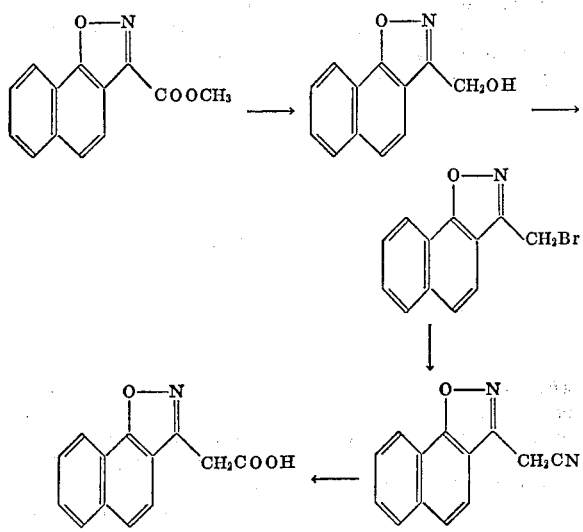

4 g. of 3-methoxycarbonylnaphth[2,1-d]isoxazole were dissolved in 50 ml. of anhydrous tetrahydrofuran, and the solution was treated in the same manner as described in the method for preparing the starting compound of Example 1. Thus, 3 g. of 3-hydroxymethylnaphth[2,1-d]isoxazole having a melting point of 145–146° C. were obtained.

5 g. of 3-hydroxymethylnaphth[2,1-d]isoxazole obtained by the above method was dissolved in 50 ml. of chloroform, and the solution was subjected to bromination in the same manner as described in Example 6. Thus, 4.7 g. of 3-bromomethylnaphth[2,1-d]isoxazole melting at 187–188° C. were obtained.

4 g. of the so obtained 3-bromomethylnaphth[2,1-d]isoxazole were treated in the same manner as described in Examples 16 and 17. Thus, 3 g. of naphth[2,1-d]isoxazolyl-3-ethanoic acid having a melting point of 182–185° C. were obtained and exhibited an absorption at $$\nu_{C=O}^{KBr} \ 1725 \ cm.^{-1}$$

in the infrared absorption spectrum.

EXAMPLE 29

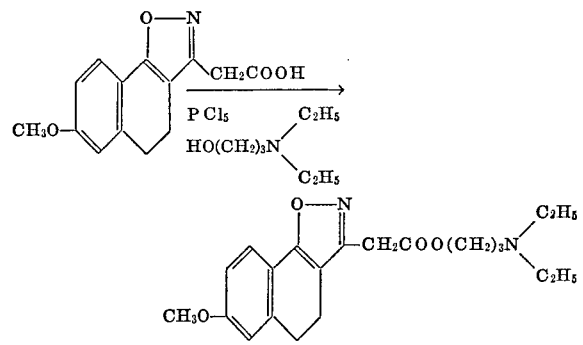

5.2 g. of 7-methoxy-4,5-dihydronaphth[2,1-d]isoxazolyl-3-ethanoic acid were dissolved in 100 ml. of chloroform, and 4.16 g. of phosphorus pentachloride were gradually added to the solution at room temperature with stirring. Chloroform or phosphoryl chloride was distilled off under reduced pressure. A solution of 4.1 g. of N,N-dimethylaminoisopropanol in 50 ml. of benzene was added dropwise to the solution over a period of about 20 minutes. Thereafter, the stirring was conducted at room temperature for 2 hours and the solution was heated at 50–60° C. for 30 minutes. Then, the solution was cooled to room temperature and was washed twice with 50 ml. of water. The organic layer was dried with salt cake and then benzene was distilled off. Thus, an oily substance was obtained. The oily substance was dissolved in ether, and hydrochloric acid gas was blown into the solution to precipitate white crystals. The formed crystals were collected and were recrystallized from ethyl acetate-methanol. Thus, 4.5 g. of N,N-dimethylaminoisopropanol ester hydrochloride of 7-methoxy-4,5-dihydronaphth[2,1-d]isoxazolyl-3-ethanoic acid melting at 178–180° C. were obtained as white crystals. The results of the examination of the infrared and ultra-violet absorption spectra and of the elementary analysis of the so obtained compound are as follows:

Infrared absorption spectrum:

IR $\nu_{C=O}^{KBr}$ 1746 cm.$^{-1}$ and IR $\nu_{NH}^{KBr}$ 2610 cm.$^{-1}$.

Ultra-violet absorption spectrum:

UV $\lambda_{max.}^{EtOH}$ 223 m$\mu$ ($\epsilon$=9,241); 299 m$\mu$ ($\epsilon$=11,063).

Elementary analysis values: Calculated (percent): C, 60.0; H, 6.61; N, 7.35. Measured (percent): C, 60.28; H, 6.71; N, 7.25.

EXAMPLE 30

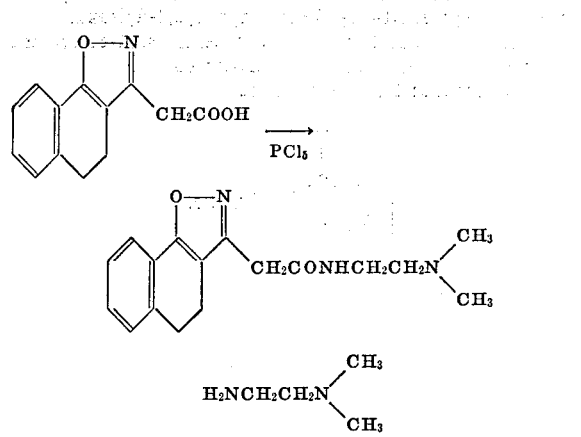

5.7 g. of 4,5-dihydronaphth[2,1-d]isoxazolyl-3-ethanoic acid were dissolved in 100 ml. of chloroform, and 6.24 g. of phosphorus pentachloride was added gradually thereto. Then, the solution was heated at 40–50° C. for 2 hours. After completion of the reaction, chloroform and phosphoryl chloride were distilled off, and the residue was dissolved in 200 ml. of dried benzene, and the solution was stirred at room temperature. 4.4 g. of N,N-dimethylaminoethylamine dissolved in 50 ml. of benzene were gradually added dropwise to the above solution. Then, the solution was stirred at room temperature for 3 hours, and was heated at 50–60° C. for 30 minutes. After the reaction mixture had been cooled to room temperature, it was washed twice with 50 ml. of water, and the organic layer was dried over salt cake. Then, benzene was distilled off. The residue was dissolved in ether, and hydrochloric acid gas was blown into the ether solution to precipitate white crystals. Then, the crystals were collected by filtration and recrystallized from a mixed solution of ethyl acetate and methanol. Thus, 3.2 g. of hydrochloride of 3-N,N-dimethylaminoethylcarbamoylmethyl-4,5-dihydronaphth[2,1-d]isoxazole having a melting point of 245–248° C. were obtained as white needle-like crystals and exhibited absorptions at $\nu_{max.}^{KBr}$ 2660 cm.$^{-1}$ ($\overset{+}{N}H$) and 1640 cm.$^{-1}$ (C=O).

What we claim is:
1. A compound of the formula

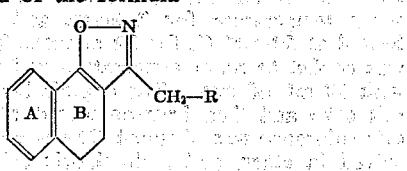

wherein ring A has 0–2 substituents selected from the group consisting of alkoxy of up to 4 carbon atoms, alkyl of up to 4 carbon atoms, and halogen, ring B may have a carbon-to-carbon double bond between the positions of C–4 and C–5, and R represents a hydroxyl group, a halogen atom or a cyano group.

2. A compound of the formula

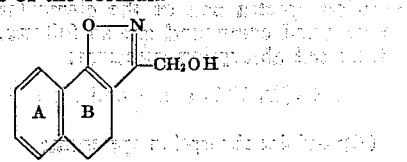

wherein ring A has 0–2 substituents selected from the group consisting of alkoxy of up to 4 carbon atoms, alkyl of up to 4 carbon atoms, and halogen, and ring B may have a carbon-to-carbon double bond between the positions of C–4 and C–5.

3. The compound of claim 2, wherein said compound is 3-hydroxymethyl-4,5-dihydronaphth[2,1-d]isoxazol.

4. The compound of claim 2, wherein said compound is 3-hydroxymethyl-naphth[2,1-d]isoxazol.

5. A compound of the formula

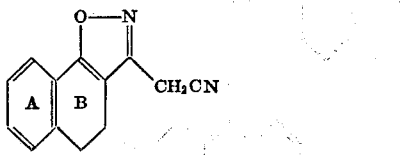

wherein ring A has 0–2 substituents selected from the group consisting of alkoxy of up to 4 carbon atoms, alkyl of up to 4 carbon atoms, and halogen, and ring B may have a carbon-to-carbon double bond between the positions of C–4 and C–5.

6. The compound of claim 5, wherein said compound is 3-cyanomethyl-4,5-dihydronaphth[2,1-d]isoxazol.

7. The compound of claim 5, wherein said compound is 3-cyanomethyl-naphth[2,1-d]isoxazol.

8. A compound of the formula

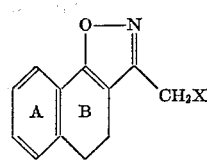

wherein ring A has 0–2 substituents selected from the group consisting of alkoxy of up to 4 carbon atoms, alkyl of up to 4 carbon atoms, and halogen, ring B may have a carbon-to-carbon double bond between the positions of C–4 and C–5, and X is a halogen.

9. The compound of claim 8, wherein said compound is 3-chloromethyl-4,5-dihydronaphth[2,1-d]isoxazol.

10. The compound of claim 8, wherein said compound is 3-bromomethyl-naphth[2,1-d]isoxazol.

References Cited

Morrison et al.: "Organic Chemistry," Allyn and Bacon (1959), pp. 365–443, 445, 810.

RAYMOND V. RUSH, Primary Examiner

U.S. Cl. X.R.

260—247.5 B, 268 PC, 293.58; 424—246, 250, 267, 272

UNITED STATES PATENT OFFICE
CERTIFICATE OF CORRECTION

Patent No. 3,842,099  Dated  October 15, 1974

Inventor(s)  Yasushi SUZUKI ET AL

It is certified that error appears in the above-identified patent and that said Letters Patent are hereby corrected as shown below:

In the Heading, insert patentees' Foreign Application Priority Data as follows:

-- Japanese Application 43-72990/68, filed October 8, 1968;
Japanese Application 43-72991/68, filed October 8, 1968;
Japanese Application 44-32241/69, filed April 26, 1969;
Japanese Application 44-32242/69, filed April 26, 1969; and
Japanese Application 44-32243/69, filed April 26, 1969. --

Correct the spelling of the assignee to read as follows:

-- Teikoku Hormone Mfg. Co., Ltd. --

Signed and sealed this 14th day of January 1975.

(SEAL)
Attest:

McCOY M. GIBSON JR.          C. MARSHALL DANN
Attesting Officer            Commissioner of Patents